(12) United States Patent
Lin et al.

(10) Patent No.: US 8,467,009 B2
(45) Date of Patent: Jun. 18, 2013

(54) LIQUID CRYSTAL DISPLAY DEVICE WITH LIGHT SOURCE MODULE ASSEMBLED TO HOUSING

(75) Inventors: Tien-Jen Lin, Miao-Li County (TW);
Yu-Yeh Chen, Miao-Li County (TW);
Hsuan-Yu Teng, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 414 days.

(21) Appl. No.: 12/765,876

(22) Filed: Apr. 23, 2010

(65) Prior Publication Data

US 2011/0019122 A1 Jan. 27, 2011

(51) Int. Cl.
*G02F 61/1333* (2006.01)
(52) U.S. Cl.
USPC .................................. 349/58; 349/60
(58) Field of Classification Search
USPC ........................................... 349/58, 60
See application file for complete search history.

(56) References Cited

U.S. PATENT DOCUMENTS

| | | | | |
|---|---|---|---|---|
| 5,691,880 A * | 11/1997 | Seto et al. | ................. | 361/679.27 |
| 6,262,785 B1 * | 7/2001 | Kim | ................................ | 349/58 |
| 6,532,152 B1 * | 3/2003 | White et al. | ................... | 361/692 |
| 7,589,803 B2 * | 9/2009 | Huo et al. | ........................ | 349/65 |
| 7,924,389 B2 * | 4/2011 | Han et al. | ........................ | 349/150 |
| 2003/0227581 A1 * | 12/2003 | Sung et al. | ...................... | 349/58 |
| 2007/0091222 A1 * | 4/2007 | Huo et al. | ........................ | 349/58 |
| 2007/0132905 A1 * | 6/2007 | Kim et al. | ........................ | 349/58 |
| 2008/0055518 A1 * | 3/2008 | Jung | ................................ | 349/67 |
| 2008/0079863 A1 * | 4/2008 | Jung et al. | ....................... | 349/58 |
| 2008/0303972 A1 * | 12/2008 | Han et al. | ........................ | 349/58 |
| 2009/0196048 A1 * | 8/2009 | Kataoka et al. | ................ | 362/297 |
| 2010/0007817 A1 * | 1/2010 | Kim | .................................. | 349/60 |
| 2011/0120770 A1 * | 5/2011 | Yokonuma | .................... | 174/94 S |
| 2011/0149200 A1 * | 6/2011 | Joo | .................................. | 349/61 |
| 2011/0164199 A1 * | 7/2011 | Han et al. | ........................ | 349/58 |
| 2011/0199787 A1 * | 8/2011 | Kim et al. | ....................... | 362/612 |
| 2011/0237300 A1 * | 9/2011 | Osaka | ........................... | 455/566 |

FOREIGN PATENT DOCUMENTS

| CN | 1641445 A | 7/2005 |
|---|---|---|
| CN | 1713046 A | 12/2005 |
| CN | 101356474 A | 1/2009 |

\* cited by examiner

*Primary Examiner* — Kaveh Kianni
(74) *Attorney, Agent, or Firm* — WPAT, PC; Justin King (57) ABSTRACT

A liquid crystal display (LCD) device includes a first housing, second housing, a liquid crystal module, and a light source module. The second housing is fixed to the first housing. The liquid crystal module and the light source module are positioned between the first housing and the second housing. The liquid crystal module is fixed to the second housing. The liquid crystal module, the first housing, and the second housing cooperatively define a receiving groove. The light source module is received in the receiving groove, and positioned on a side of the liquid crystal module. An assembling method of the LCD device is also provided.

15 Claims, 13 Drawing Sheets

LIQUID CRYSTAL DISPLAY DEVICE WITH LIGHT SOURCE MODULE ASSEMBLED TO HOUSING

BACKGROUND

1. Technical Field

The present disclosure relates generally to liquid crystal display (LCD) devices and, more particularly, to an LCD device having a light source module.

2. Description of Related Art

LCD devices have largely replaced conventional cathode ray tube (CRT) due to their excellent display quality and thinner, lighter construction. Since the liquid crystal cannot emit light, an LCD device generally has a light source module for emitting the light.

Presently, the light source module is received in the LCD device before many of the other components of the LCD, such as a liquid crystal module. However, if the light source module is broken or does not match the installed liquid crystal module, replacement thereof is difficult and may damage the other components of the LCD device.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
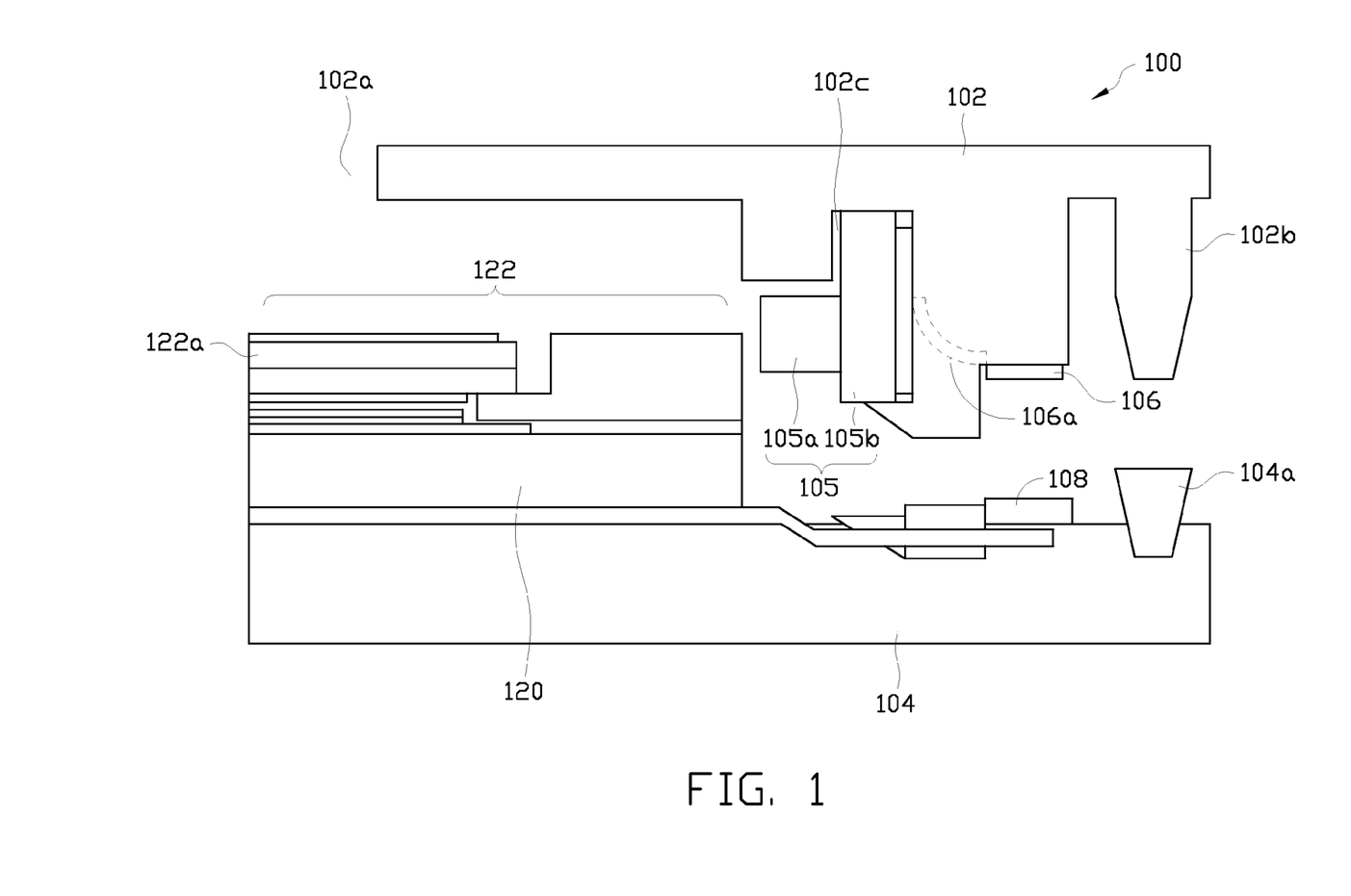
FIG. 1 is a cross-section of a first embodiment of an LCD device.

Referring to FIG. 1, a first embodiment of an LCD device 100 includes a first housing 102 and a second housing 104. The first housing 102 and the second housing 104 are assembled together to form a space for receiving other components of the LCD device 100, such as a light source module 105, a liquid crystal module 122 and a light guide plate 120. The light source module 105 can include a plurality of light-emitting diodes (LEDs) or cold cathode fluorescent lamps (CCFLs). The first housing 102 defines an opening 102a exposing a display area of the LCD device 100. Upon a plurality of positioning poles 102b of the first housing 102 are engageably received in the positioning holes 104a of the second housing 104, the LCD device 100 is assembled.

In the illustrated embodiment, the light source module 105 is received in an assembly groove 102c of the first housing 102. The liquid crystal module 122 includes a liquid crystal panel, a plurality of optical films, and a light guide plate 120 received in the second housing 104. The light source module 105 includes a base plate 105b and a plurality of LEDs 105a mounted on the base plate 105b. The light source module 105 is connected to a first connector 106 of the first housing 102 via a cable 106a. After the LCD device 100 is assembled, the first connector 106 is attached to a second connector 108 of the second housing 104, thus connecting the light source module 105 to an electrical source (not shown). The light source module 105 is aligned with the light guide plate 120, so that the light emitting from the light source module 105 is emitted on the liquid crystal module 122 after passing through the light guide plate 120. A liquid crystal panel 122a of the liquid crystal module 122 is positioned on a side of the light source module 105.

If the light source module 105 is broken or does not match the liquid crystal module 122, the light source module 105 together with the first housing 102, being received therein, can be directly removed from the LCD device 100. Therefore, the light source module 105 can be easily replaced with no damage caused to other components.

Figure 2:
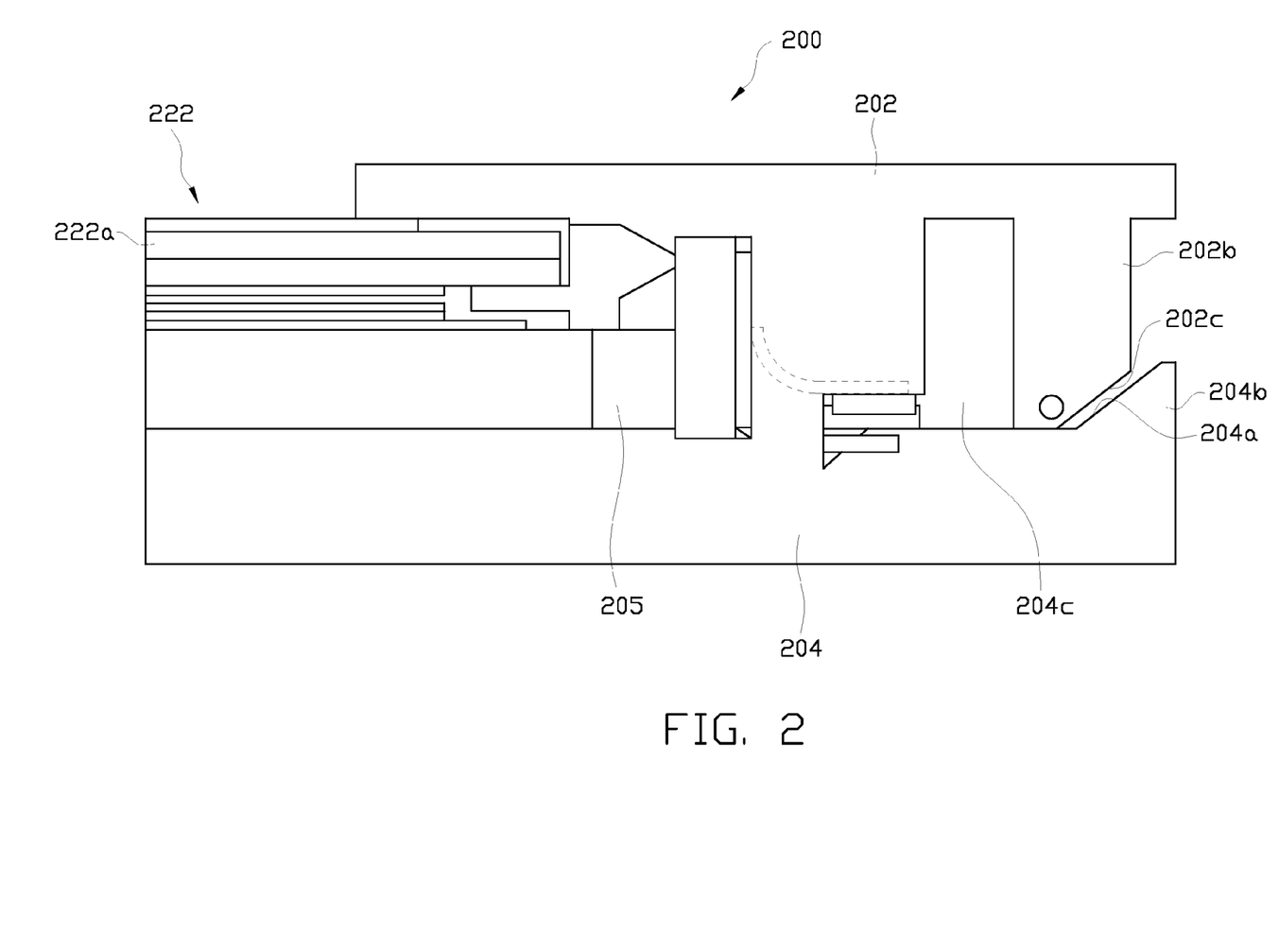
FIG. 2 is a cross-section of a second embodiment of an LCD device.

Referring to FIG. 2, a second embodiment of an LCD device 200 differs from the LCD device 100 of the first embodiment in that each positioning pole 202b of a first housing 202 forms a first angled surface 202c at an end, and a sidewall 204b of a second housing 204 correspondingly forms a slope 204a. The first housing 202 defines an opening 202a exposing a display area of the LCD device 200. In addition, a receiving groove 204c for receiving the light source module 205 is defined between a liquid crystal panel 222a and the sidewall 204b. After the first angled surface 202c of each positioning pole 202b slides from the slope 204a, the first housing 202 and the second housing 204 are fixed together, and the liquid crystal panel 222a of a liquid crystal module 222 is positioned on a side of a light source module 205, and is not positioned in between the first housing 202 and the light source module 205.

Figure 3:
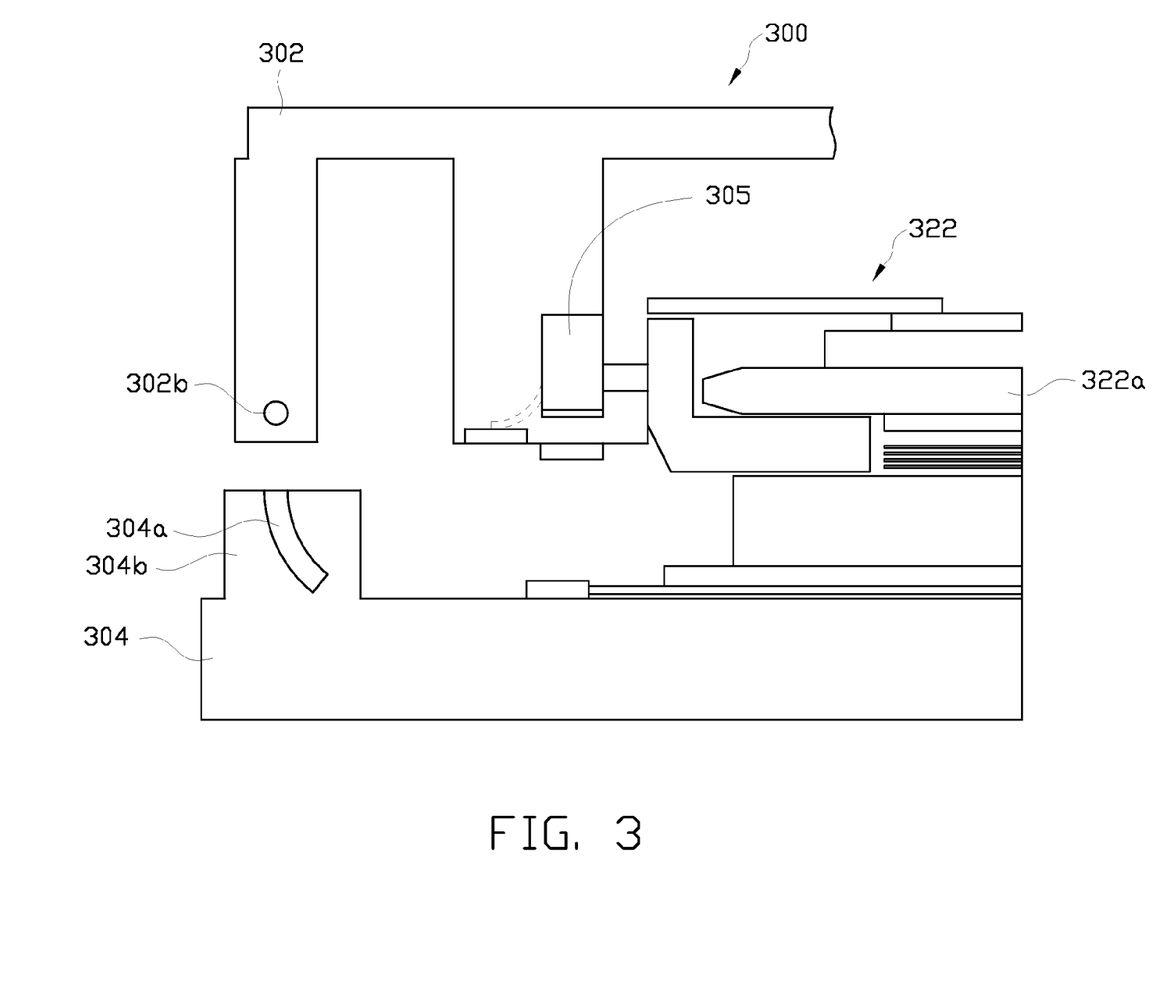
FIG. 3 is a cross-section of a third embodiment of an LCD device.

Referring to FIG. 3, a third embodiment of an LCD device 300 differs from LCD device 200 of the second embodiment in that the first housing 302 forms a plurality of positioning poles 302b, and the second housing 304 forms a plurality of curved grooves 304a corresponding thereto. After the positioning poles 302b slide to a bottom of the curved grooves 304a, the first housing 302 and the second housing 304 are fixed. A liquid crystal panel 322a of a liquid crystal module 322 is positioned on a side of a light source module 305.

Figure 4:
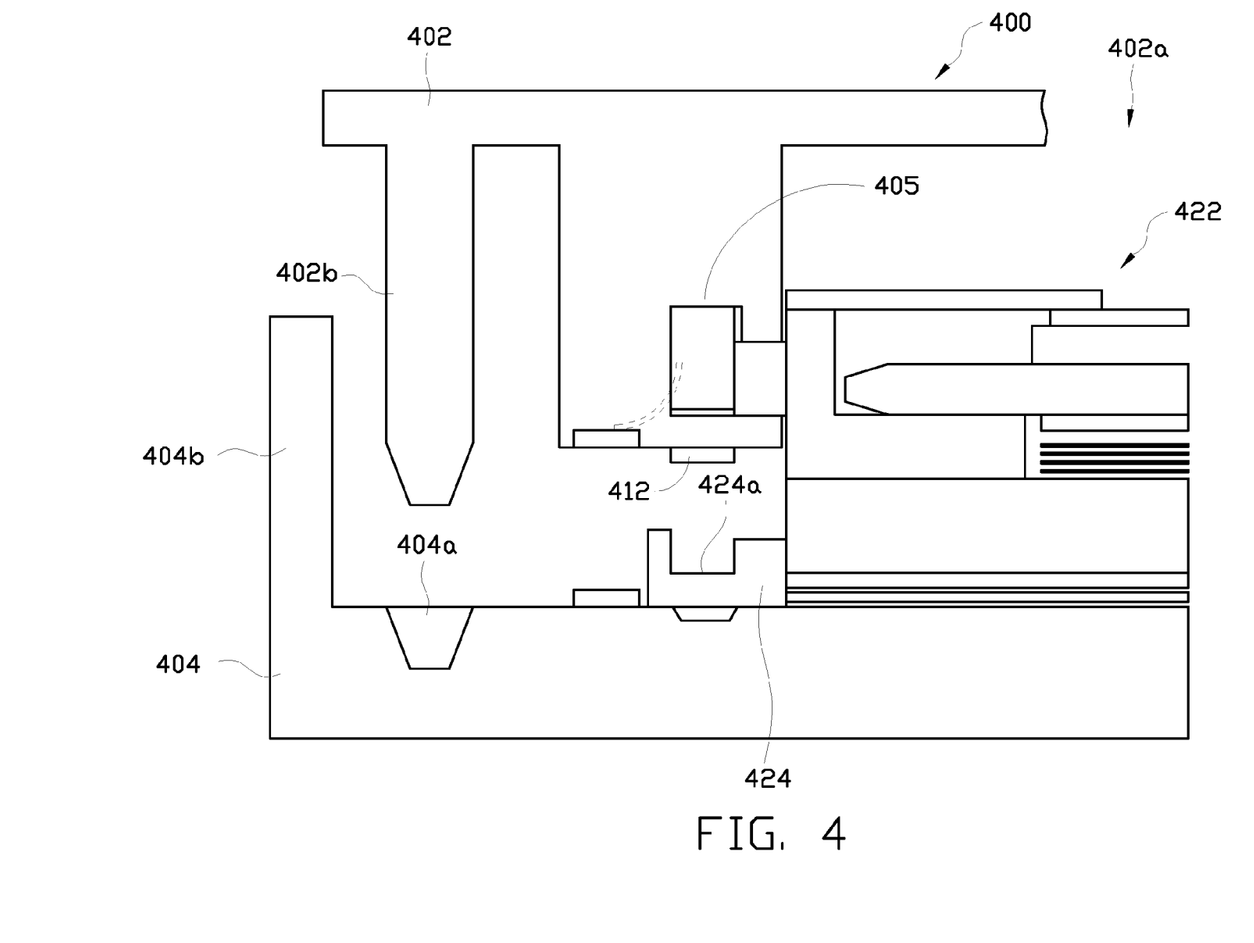
FIG. 4 is a cross-section of a fourth embodiment of an LCD device.

Referring to FIG. 4, a fourth embodiment of an LCD device 400 differs from the LCD device 100 of the first embodiment in that the first housing 402 forms a plurality of positioning poles 402b and a positioning protrusion 412, correspondingly, the second housing 404 defines a plurality of positioning holes 404a and a frame 424 of the liquid crystal module 422 defines a positioning groove 424a. After the positioning poles 402b are received in the positioning holes 404a of the second housing 404, and the positioning protrusion 412 is received in the positioning groove 424a of the frame 424, the LCD device 400 is assembled.

Figure 5:
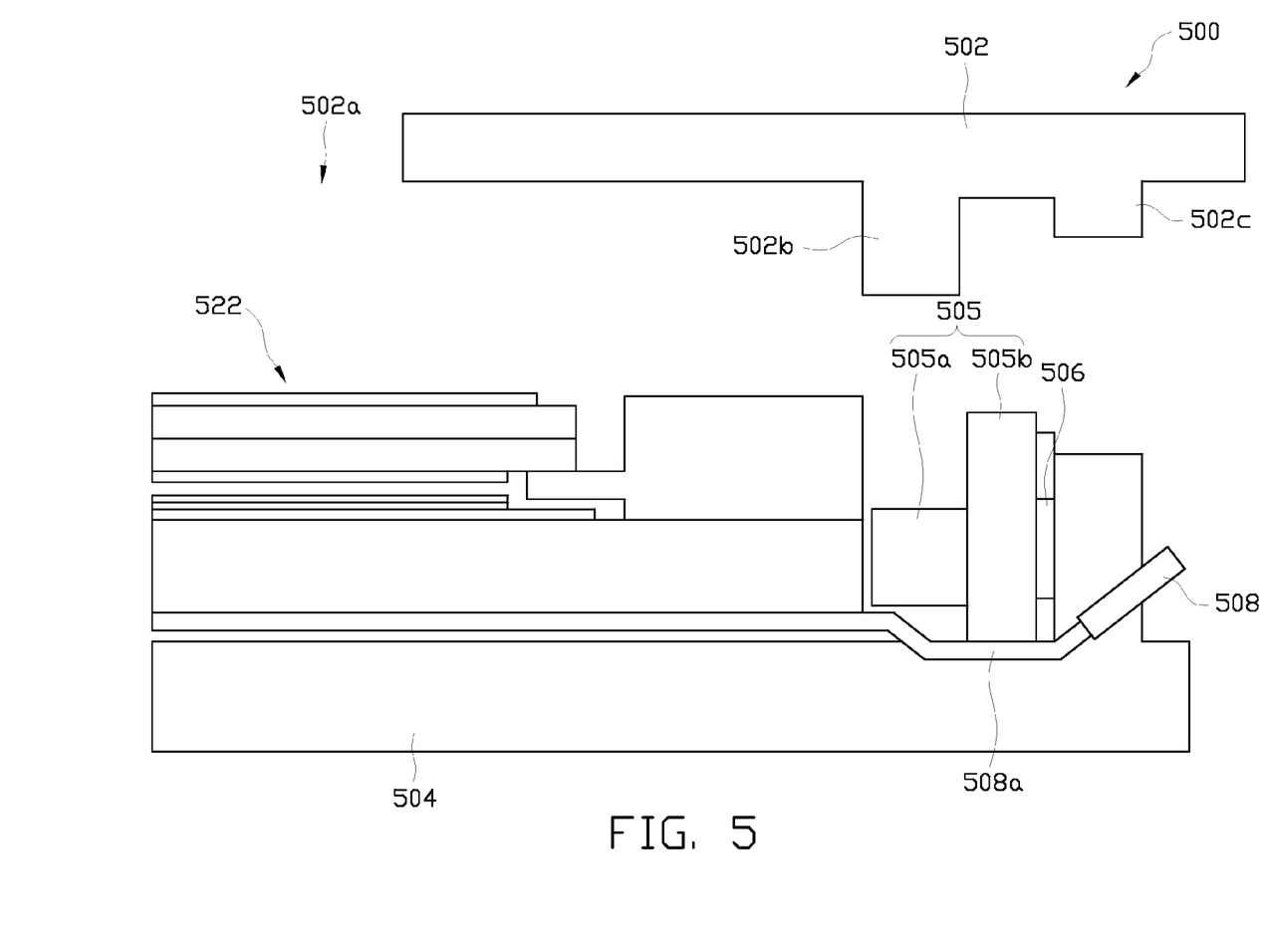
FIG. 5 is a cross-section of a fifth embodiment of an LCD device including a light source module, a liquid crystal module, a first housing, and a second housing.

Referring to FIG. 5, a fifth embodiment of an LCD device 500 includes a first housing 502 and a second housing 504. The first housing 502 and the second housing 504 are assembled together and form a space for receiving the other components of the LCD device 500, such as a light source module 505, a liquid crystal module 522 and a light guide plate 520. The light source module 505 can include a plurality of LEDs or CCFLs. The first housing 502 defines an opening 502a exposing a display area of the LCD device 500.

In the illustrated embodiment, the light source module 505 is positioned on a side of the second housing 504, thus the liquid crystal module 522, the light guide plate 520 and the second housing 504 cooperatively define a receiving groove 504c for receiving the light source module 505. The light source module 505 includes a base plate 505b and a plurality of LEDs 505a positioned on the base plate 105b. The light source module 505 is connected to a first connector 506. The first connector 506 is connected to a second connector 508, which is connected to the electrical source via a cable 508a. The first housing 502 forms a first positioning protrusion 502b and a second positioning protrusion 502c. After the first housing 502 and the second housing 504 are assembled together, an end of the base plate 105b is sandwiched between the first positioning protrusion 502b and the second positioning protrusion 502c. The light source module 505 is positioned on a side of the liquid crystal module 522.

Figure 5A:
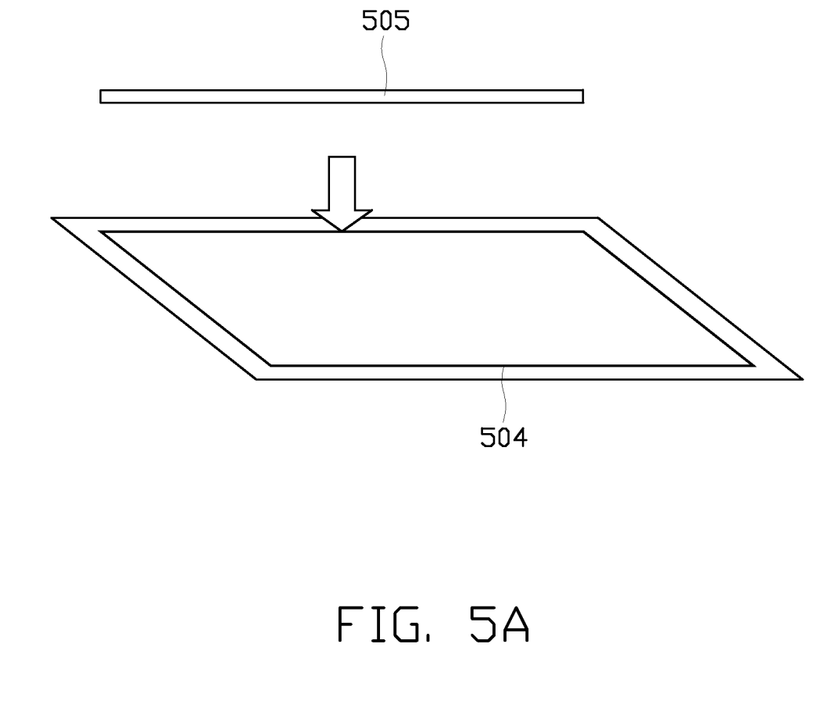
FIGS. 5A and 5B are a plurality of schematic views of the light source module being attached to the second housing of FIG. 5.
Figure 5B:
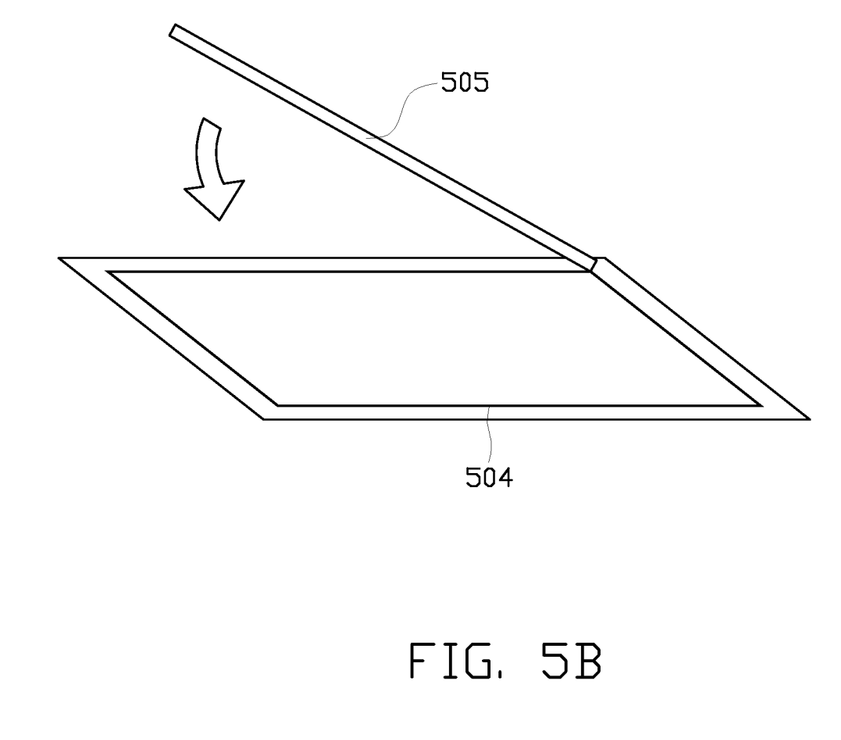

Referring to FIG. 5A, opposite ends of the light source module 505 can be fixed to the second housing 504 simultaneously. Referring to FIG. 5B, an end of the light source module 505 is fixed to the second housing 504, and then, the other end of the light source module 505 is fixed to the second housing 504.

If the light source module 505 is broken or does not match the liquid crystal module 522, the light source module 505 can be directly removed from the second housing 504, after the first housing 502 is detached from the second housing 504. The light source module 505 can be easily replaced, and presents no damage to the other components of the LCD device 500.

Figure 6:
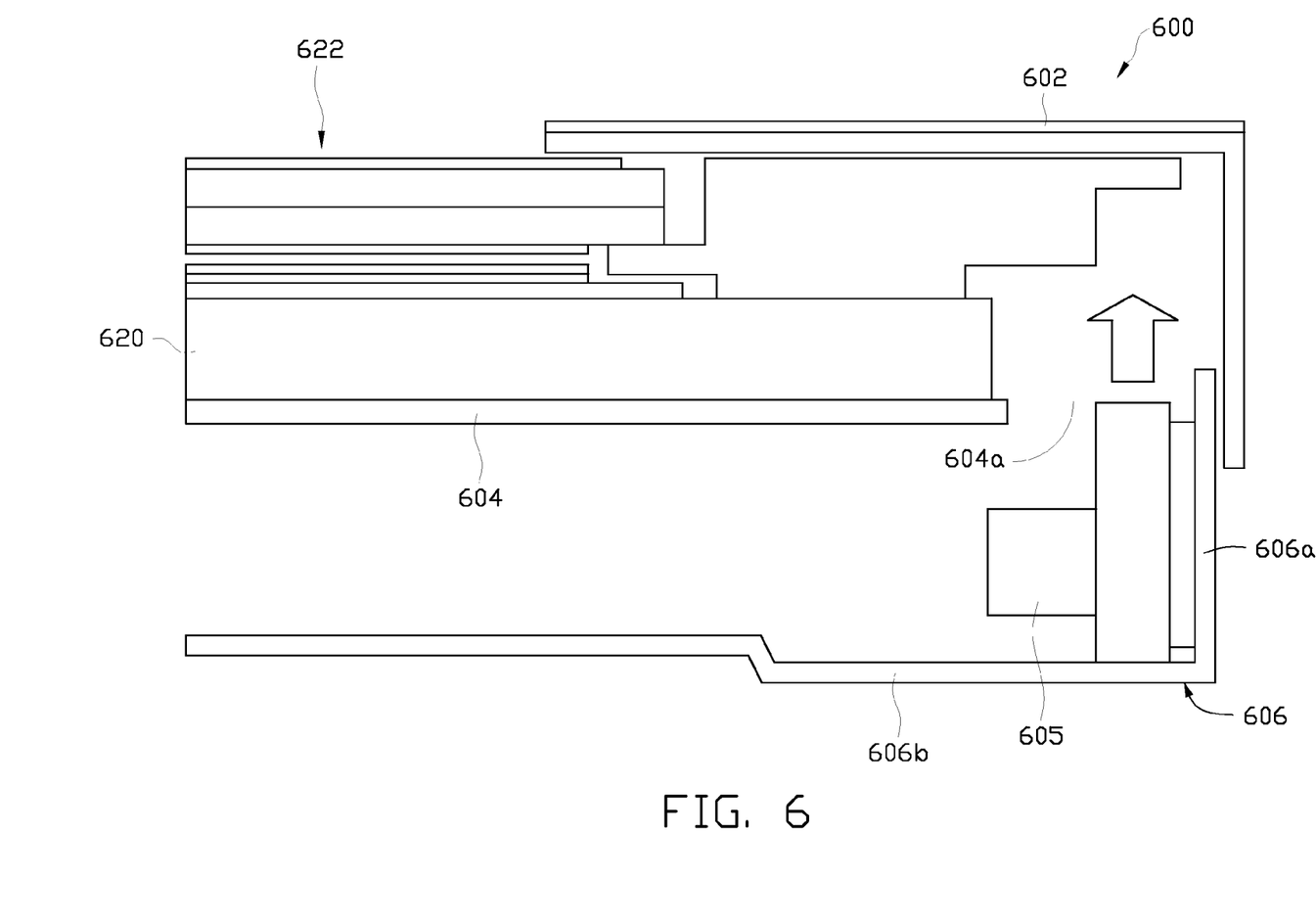
FIG. 6 is a cross-section of a sixth embodiment of an LCD device including a light source module, a liquid crystal module, a first housing, and a second housing.
Figure 6A:
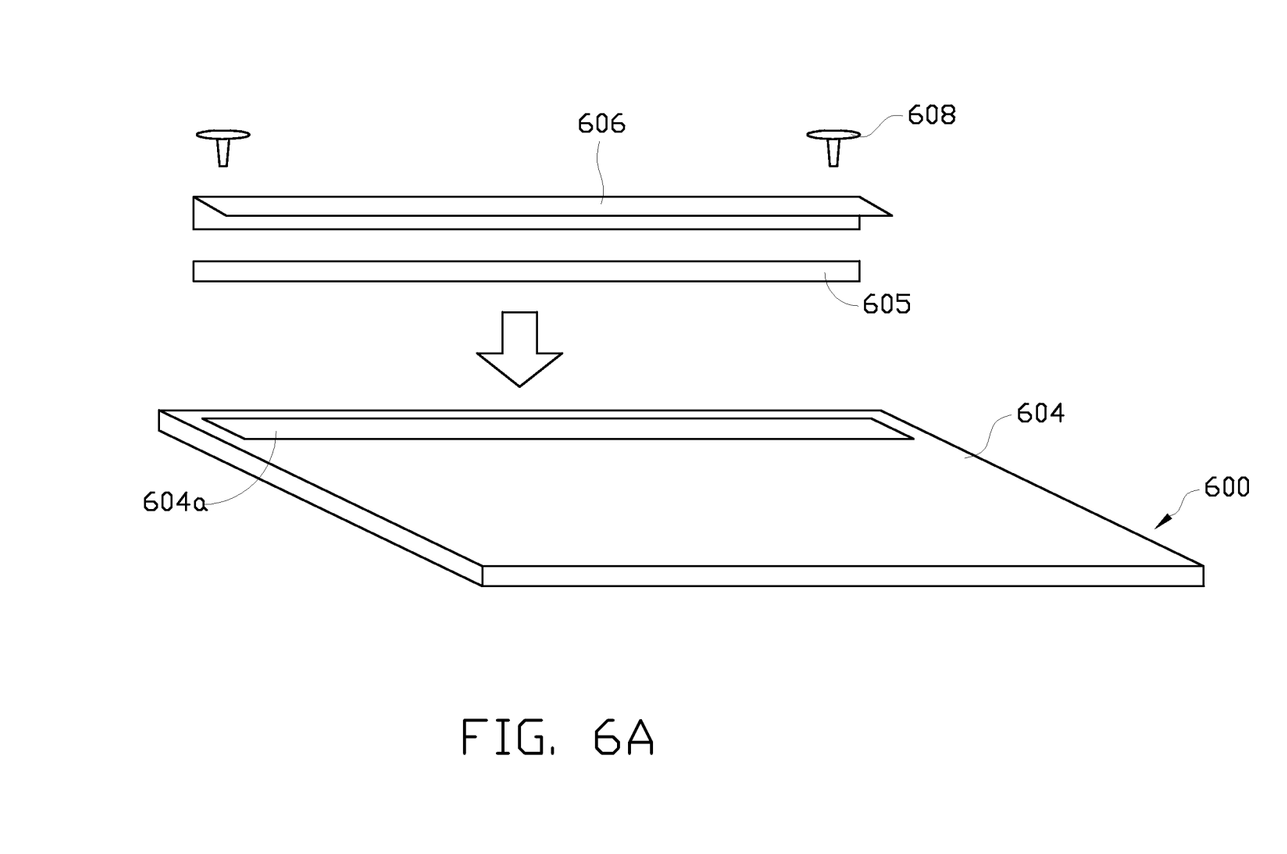
FIG. 6A is an isometric view of the light source module being installed in the second housing of FIG. 6.

Referring to FIGS. 6 and 6A, a sixth embodiment of an LCD device 600 includes a first housing 602, a second housing 604, and a reflector 606. A liquid crystal module 622 and a light guide plate 620 are positioned between the first housing 602 and the second housing 604, cooperatively defining a receiving groove 604a. In the illustrated embodiment, the reflector 606 is substantially L-shaped and includes a first sidewall 606a and a second sidewall 606b longer than the first sidewall 606a. A light source module 605 is fixed to the first sidewall 606a. After the reflector 606 is fixed to the second housing 604 via a plurality of fasteners 608, the light source module 605 is received in the receiving groove 604a, and the second sidewall 606b envelops the receiving groove 604a. The light source module 605 is positioned on a side of the liquid crystal module 622.

If the light source module 605 is broken or does not match the liquid crystal module 622, the light source module 605 together with the reflector 606 can be directly removed from the LCD device 600, because the light source module 605 is positioned thereon. That is, the light source module 605 can be easily be replaced, and presents no damage to the other components of the LCD device 600.

Figure 7:
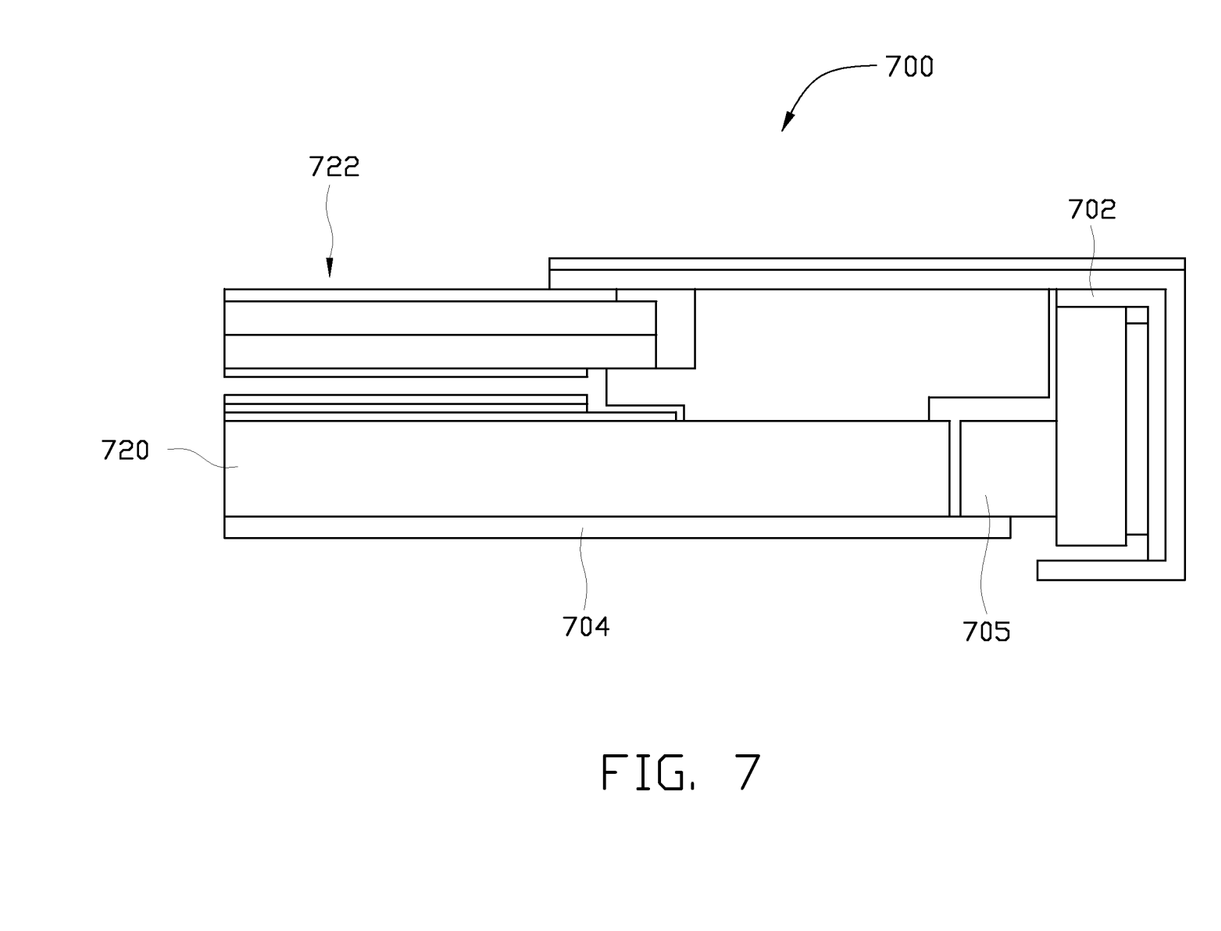
FIG. 7 is a cross-section of a seventh embodiment of an LCD device including a light source module, a liquid crystal module, a first housing, and a second housing.
Figure 7A:
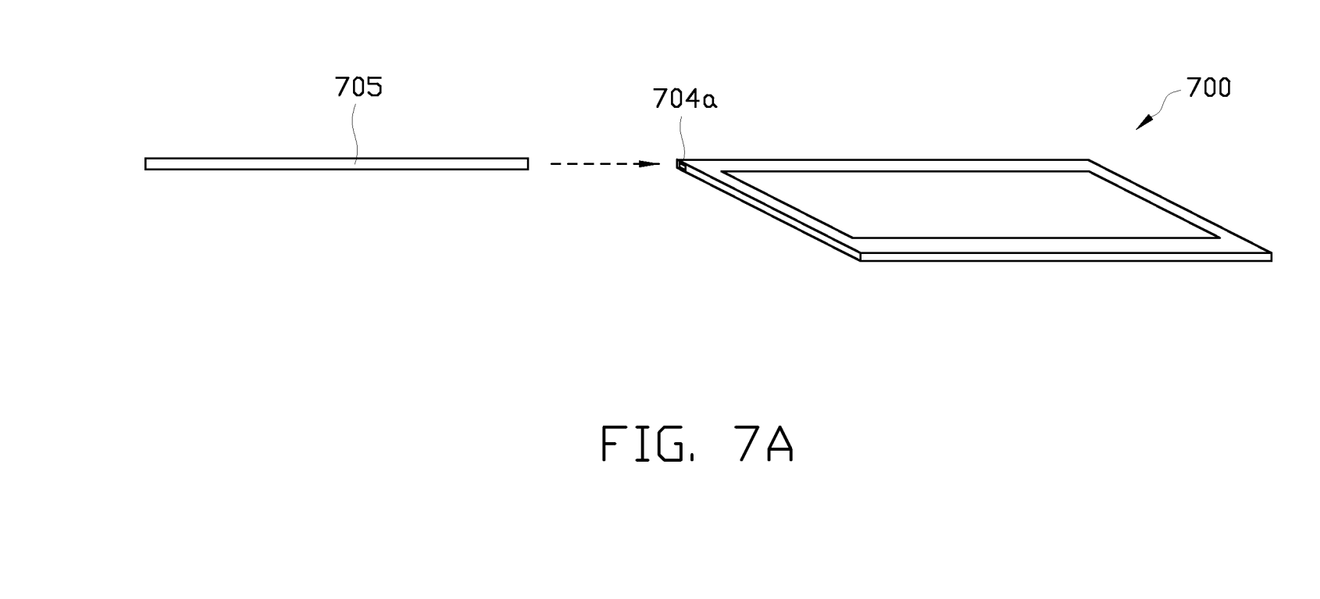
FIG. 7A is an isometric view of the light source module being installed in the second housing of FIG. 7.

Referring to FIGS. 7 and 7A, a seventh embodiment of an LCD device 700 includes a first housing 702 and a second housing 704. A liquid crystal module 722 and a light guide plate 720 are positioned between the first housing 702 and the second housing 704, thus cooperatively defines a receiving groove 704a. A light source module 705 can be directly inserted into the receiving groove 704a of the LCD device 700. The light source module 705 can be easily replaced, and presents no damage to the other components of the LCD device 700.

Referring to FIGS. 1 through 7, the first through the seventh embodiments of the LCD device 100, 200, 300, 400, 500, 600, 700, respectively, includes the first housing 102, 202, 302, 402, 502, 602, 702 and the second housing 104, 204, 304, 504, 604, 704. The first housing 102, 202, 302, 402, 502, 602, 702 and the second housing 104, 204, 304, 504, 604, 704 are assembled together to form a space for receiving the other components of the LCD device 100, 200, 300, 400, 500, 600, 700, such as the light source module 105, 205, 305, 405, 505, 605, 705, the liquid crystal module 122, 222, 322, 422, 522, 622, 722 and the light guide plate 120, 520, 620, 720 (first, fifth, sixth, and seventh embodiment). The light source module 105, 205, 305, 405, 505, 605, 705 can include a plurality of light-emitting diodes (LEDs) or cold cathode fluorescent lamps (CCFLs). The first housing 102, 202, 402, 502 defines the opening 102a, 202a, 402a, 502a (first second, fourth, and fifth embodiment) exposing a display area of the LCD device 100, 200, 400, 500, respectively. In the illustrated embodiments, the first housing 102, 202, 302, 402 and the light source module 105, 205, 305, 405 together are assembled with the second housing 104, 204, 304, 404. The liquid crystal module 122, 222, 322, 422, 522, 622, 722 includes the liquid crystal panel, a plurality of optical films, and the light guide plate 120, 220, 320, 420, 520, 620, 720 received in the second housing 104, 204, 304, 504, 604, 704. The light source module 105, 205, 305, 405, 505, 605, 705 includes the base plate 105b, 505b (first and fifth embodiment) and a plurality of LEDs 105a, 505a mounted on the base plate 105b, 505b. The light source module 105, 205, 305, 405, 505, 605, 705 is connected to the first connector 106, 506 (first and fifth embodiment) of the first housing 102, 202, 302, 402, 502, 602, 702 via the cable 106a (first embodiment). After the LCD device 100, 200, 300, 400, 500, 600, 700 is assembled, the first connector 106, 506 (first and fifth embodiment) is attached to the second connector 108, 208, 308, 408, 508 (first through fifth embodiment) of the second housing 104, 204, 304, 404, 504, thus connecting the light source module 105, 205, 305, 405, 505 to the electrical source (not shown). The light source module 105, 205, 305, 405, 505, 605, 705 is aligned with the light guide plate 120, 620, 720 (first, sixth, and seventh embodiment) so that the light emitting from the light source module 105, 205, 305, 405, 505, 605, 705 is emitted on the liquid crystal module 122, 222, 322, 422, 522, 622, 722 after passing through the light guide plate 120, 220, 320, 420, 520, 620, 720. The liquid crystal panel 122a, 222a, 322a of the liquid crystal module 122, 222, 322, 422, 522, 622, 722 is positioned on a side of the light source module 105, 205, 305, 405, 505, 605, 705 and is not positioned in between the first housing 102, 202, 302, 402, 502, 602, 702 and the light source module 105, 205, 305, 405, 505, 605, 705.

Figure 8:
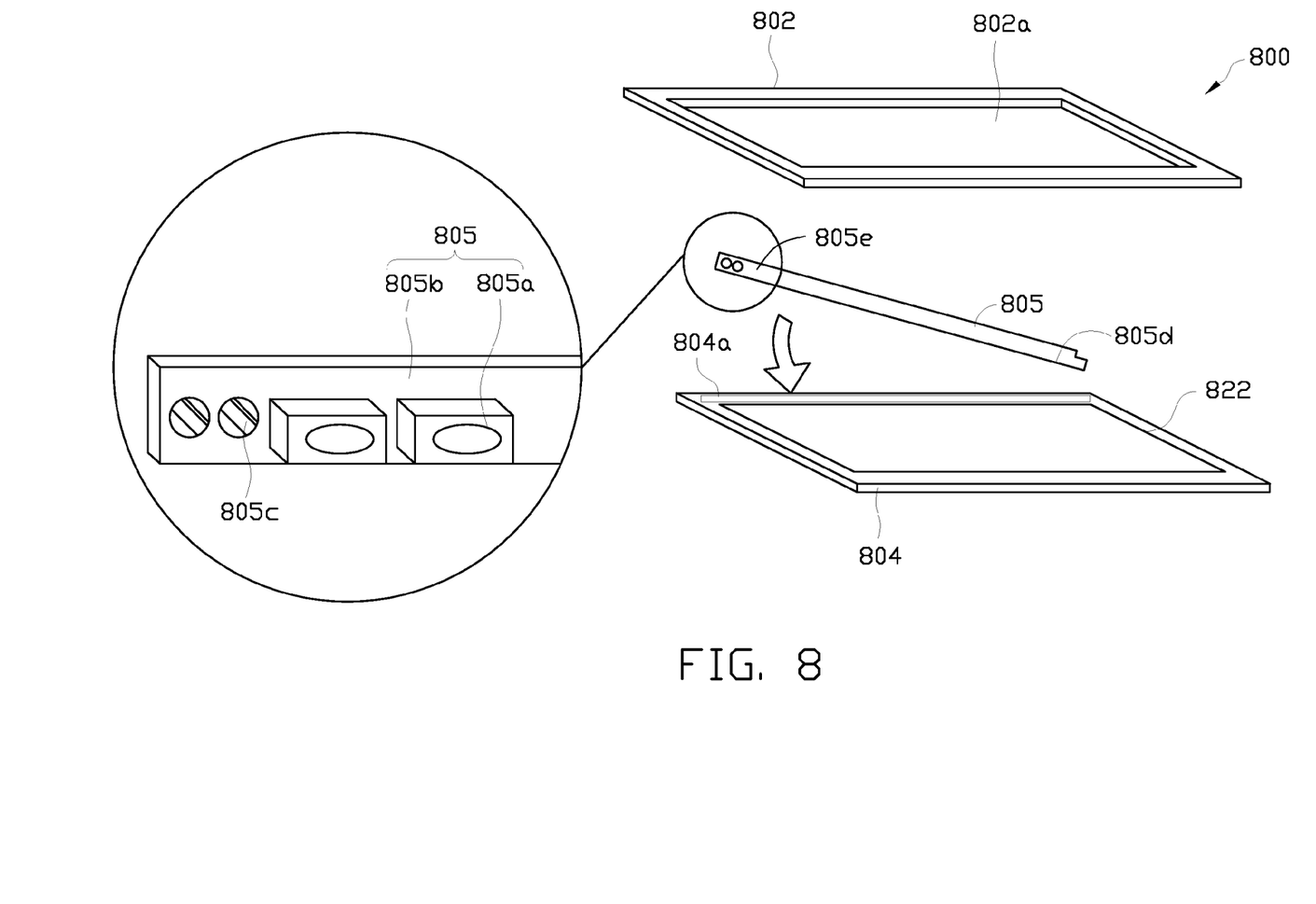
FIG. 8 is an exploded, isometric view of eighth embodiment of an LCD device including a light source module, a liquid crystal module, a first housing, and a second housing.
Figure 8A:
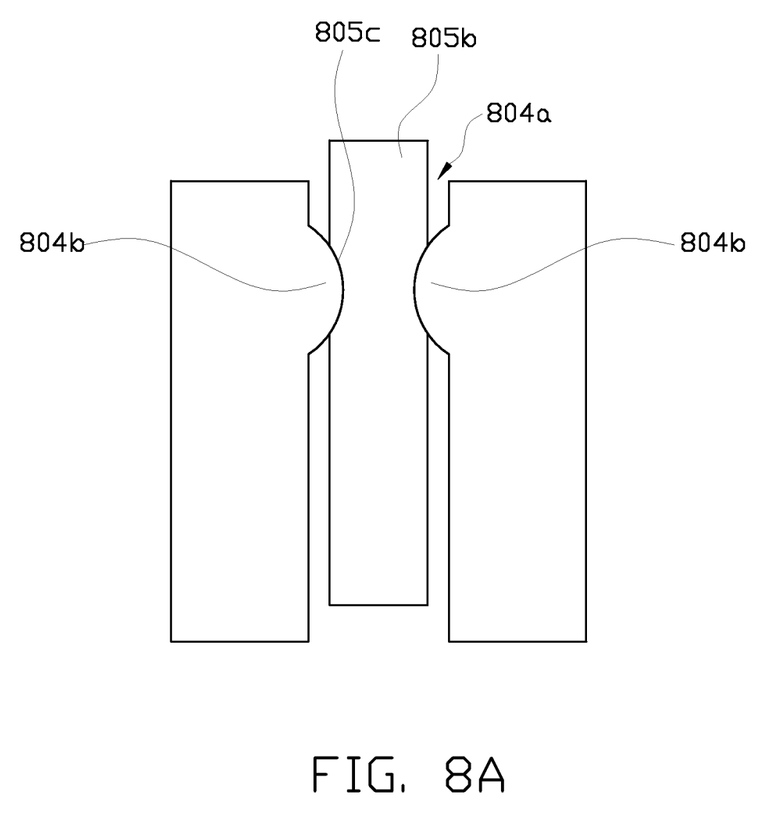
FIG. 8A is a schematic view of the light source module of FIG. 8 being installed in the second housing.

Referring to FIGS. 8 and 8A, an eighth embodiment of an LCD device 800 includes a first housing 802 and a second housing 804. The first housing 802 and the second housing 804 are assembled together to form a space for receiving the other components of the LCD device 800, such as a light source module 805. The light source module 805 can include a plurality of light-emitting diodes (LEDs) or cold cathode fluorescent lamps (CCFLs) The first housing 802 defines an opening 802a exposing a display area of the LCD device 800.

In the illustrated embodiment, the second housing 804 defines an assembly groove 804a. The light source module 805 includes a base plate 805b and a plurality of LEDs 805a positioned on the base plate 805b. The base plate 805b has a first end 805d and a second end 805e. The first end 805d has a stepped cross-section, and is firstly mounted in the assembly groove 804a, then the second end 805 is mounted in the assembly groove 804a. A sidewall of the assembly groove 804a forms a plurality of restricting protrusions 804b. The base plate 805b further defines a plurality of restricting grooves 805c. When the light source module 805 is received in the assembly groove 804a of the second housing 804, the restricting protrusions 804b are received in the restricting grooves 805c of the base plate 805b (as shown in FIG. 8A).

When the first housing 802 is detached from the second housing 804, the light source module 805 can be easily replaced because the light source module 805 is received in the assembly groove 804a of the second housing 804, and presents no damage to the other components of the LCD device 800.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A liquid crystal display (LCD) device, comprising:
   a first housing;
   a second housing fixed to the first housing; and
   a liquid crystal module and a light source module positioned between the first housing and the second housing, the liquid crystal module fixed to one of the first housing and the second housing;
   wherein the liquid crystal module, the first housing, and the second housing cooperatively define a receiving groove, the light source module is received in the receiving groove, and positioned on a side of the liquid crystal module, and the liquid crystal module is not positioned in between the first housing and the light source module; and
   wherein the first housing forms a plurality of positioning poles, each positioning pole forms a first angled surface at an end thereof, and a sidewall of the second housing is correspondingly angled to form a slope.

2. The LCD device of claim 1, wherein the first housing defines an opening exposing a display area of the LCD device.

3. The LCD device of claim 2, wherein the liquid crystal module and the light source module are fixed on the second housing.

4. The LCD device of claim 3, wherein the first housing forms a first positioning protrusion and a second positioning protrusion, and the base plate of the light source module is sandwiched between the first positioning protrusion and the second positioning protrusion.

5. The LCD device of claim 2, wherein the second housing defines an assembly groove for receiving the light source module.

6. The LCD device of claim 5, wherein the base plate of the light source module has a first end and a second end, and the first end comprising a stepped cross-section.

7. The LCD device of claim 5, wherein the base plate defines a plurality of restricting grooves, and a sidewall of each assembly groove forms a plurality of restricting protrusions, and the restricting protrusions are received in the restricting grooves.

8. The LCD device of claim 1, wherein the light source module includes a base plate and a plurality of light-emitting diodes mounted on the base plate.

9. The LCD device of claim 1, wherein the first housing defines an assembly groove for receiving the light source module.

10. The LCD device of claim 1, further comprising a light guide plate, the light guide plate, the liquid crystal module, the first housing, and the second housing cooperatively define the receiving groove.

11. The LCD device of claim 1, wherein the second housing defines a plurality of the positioning holes, and the first housing forms a plurality of positioning poles engageably receiving in the positioning holes.

12. The LCD device of claim 11, wherein the light source module is connected to a first connector of the first housing, the second housing has a second connector, and the first connector is attached to the second connector.

13. The LCD device of claim 1, wherein the second housing forms a plurality of curved grooves in which the positioning poles are slidably received.

14. The LCD device of claim 1, further comprising a reflector, and the reflector is fixed to the light source module and the light source module is received in the receiving groove of the LCD device.

15. The LCD device of claim 1, wherein the reflector is substantially L-shaped and comprises a first sidewall and a second sidewall longer than the first sidewall, wherein the light source module is fixed to the first sidewall, and the second sidewall envelops the receiving groove.

* * * * *